(12) United States Patent
Yang et al.

(10) Patent No.: US 10,792,590 B2
(45) Date of Patent: Oct. 6, 2020

(54) VACUUMING APPARATUS

(71) Applicant: General Electric Company, Schenectady, NY (US)

(72) Inventors: Xuyong Yang, Beijing (CN); Xiaoyan Zhang, Beijing (CN)

(73) Assignee: General Electric Company, Schenectady, NY (US)

( * ) Notice: Subject to any disclaimer, the term of this patent is extended or adjusted under 35 U.S.C. 154(b) by 348 days.

(21) Appl. No.: 15/878,887

(22) Filed: Jan. 24, 2018

(65) Prior Publication Data

US 2018/0207553 A1  Jul. 26, 2018

(30) Foreign Application Priority Data

Jan. 25, 2017  (CN) .......................... 2017 1 0060980

(51) Int. Cl.
*B01D 19/00* (2006.01)
*H05G 1/02* (2006.01)
*H05G 1/04* (2006.01)

(52) U.S. Cl.
CPC ..... *B01D 19/0036* (2013.01); *B01D 19/0063* (2013.01); *H05G 1/02* (2013.01); *H05G 1/04* (2013.01)

(58) Field of Classification Search
CPC .. B01D 19/0036; B01D 19/0063; H05G 1/02; H05G 1/04
See application file for complete search history.

(56) References Cited

U.S. PATENT DOCUMENTS

2008/0135494 A1* 6/2008 Usher .................... B63B 35/32
210/747.6

* cited by examiner

*Primary Examiner* — Cabrena Holecek

(57) ABSTRACT

The present invention provides a vacuuming apparatus for removing bubbles from an oil immersed device containing components immersed in insulating oil. The vacuuming apparatus comprises: a supporting mechanism for supporting the oil immersed device; a swinging mechanism for swinging the supporting mechanism and the oil immersed device supported thereby; and a vacuuming mechanism for vacuuming the oil immersed device.

15 Claims, 10 Drawing Sheets

VACUUMING APPARATUS

FIELD

The present invention relates to vacuuming processing, particularly to a vacuuming apparatus for removing bubbles from an oil immersed device containing oil-immersed components.

BACKGROUND

At present, some high voltage oil-immersed components such as a high voltage generator and an X-ray tube have been applied in medical devices such as a CT (Computed Tomography) system and an X-ray machine. When there exist bubbles in insulating oil in which such high voltage oil-immersed components are immersed, sparking may occur inside the device, thus causing artifacts to be generated on images of the CT system and the components to break down. In high altitude regions such as Linzhi and the like, a condition under which bubbles appear in the insulating oil and thus causing the components to break down will particularly occur easily. However, since the high voltage generator and the X-ray tube are both core components of the CT system and are very difficult to be repaired on site, once these components break down, the CT system cannot operate normally.

The existing solution is to replace a plurality of high voltage generators or X-ray tubes, until a high voltage generator or an X-ray tube that can make the CT system operate normally is mounted. For the high voltage generators and X-ray tubes that have already been caused by the bubbles in the insulating oil to have problems such as artifacts and the like, they can only be delivered to the manufacturers, to be repaired after the insulating oil in the devices is all poured out. This increases the cost on usage and maintenance of the CT system.

To this end, there is a need for a vacuuming apparatus for removing bubbles from an oil immersed device containing components immersed in insulating oil.

SUMMARY

One exemplary embodiment of the present invention provides a vacuuming apparatus for removing bubbles from an oil immersed device containing components immersed in insulating oil, the vacuuming apparatus comprising: a supporting mechanism for supporting the oil immersed device; a swinging mechanism for swinging the supporting mechanism and the oil immersed device supported thereby; and a vacuuming mechanism for vacuuming inside the oil immersed device.

The vacuuming apparatus according to the embodiments of the present invention can remove bubbles from the oil immersed device containing components immersed in insulating oil, thus preventing sparking caused by bubbles.

Other features and aspects will be apparent through the following detailed description, figures and claims.

BRIEF DESCRIPTION OF THE DRAWINGS

The present invention can be better understood in light of the description of exemplary embodiments of the present invention with reference to the accompanying drawings. In the accompanying drawings, the same or similar reference signs represent the same or similar components, in which.

DETAILED DESCRIPTION

Hereafter, a detailed description will be given for preferred embodiments of the present disclosure. It should be pointed out that in the detailed description of the embodiments, for simplicity and conciseness, it is impossible for the Description to describe all the features of the practical embodiments in details. It should be understood that in the process of a practical implementation of any embodiment, just as in the process of an engineering project or a designing project, in order to achieve a specific goal of the developer and in order to satisfy some system-related or business-related constraints, a variety of decisions will usually be made, which will also be varied from one embodiment to another. In addition, it can also be understood that although the effort made in such developing process may be complex and time-consuming, some variations such as design, manufacture and production on the basis of the technical contents disclosed in the disclosure are just customary technical means in the art for one of ordinary skilled in the art associated with the contents disclosed in the present disclosure, which should not be regarded as insufficient disclosure of the present disclosure.

Unless defined otherwise, all the technical or scientific terms used in the Claims and the Description should have the same meanings as commonly understood by one of ordinary skilled in the art to which the present disclosure belongs. The terms "first", "second" and the like in the Description and the Claims of the present utility model do not mean any sequential order, number or importance, but are only used for distinguishing different components. The terms "a", "an" and the like do not denote a limitation of quantity, but denote the existence of at least one. The terms "comprises", "comprising", "includes", "including" and the like mean that the element or object in front of the "comprises", "comprising", "includes" and "including" covers the elements or objects and their equivalents illustrated following the "comprises", "comprising", "includes" and "including", but do not exclude other elements or objects. The term "coupled" or "connected" or the like is not limited to being connected physically or mechanically, nor limited to being connected directly or indirectly.

Figure 1:
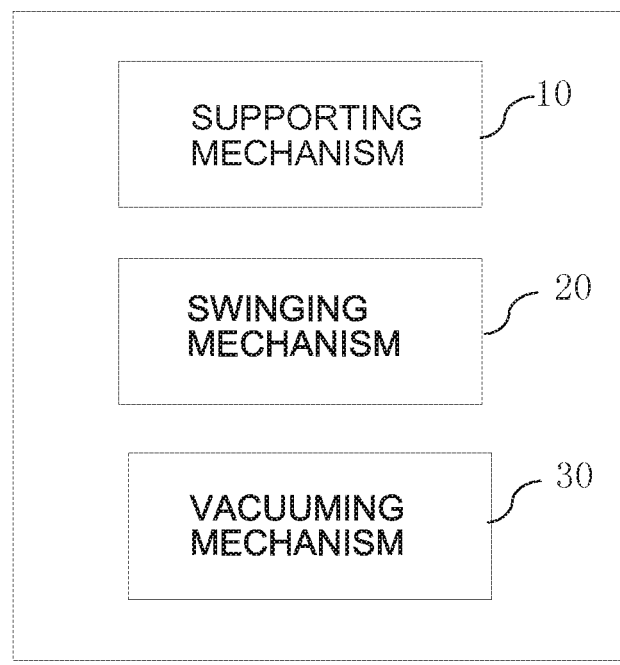
FIG. 1 is a schematic block diagram of a vacuuming apparatus according to a first embodiment of the present invention.

According to the first embodiment of the present invention, a vacuuming apparatus is provided to remove bubbles from an oil immersed device containing components immersed in insulating oil. As shown in FIG. 1, the vacuuming apparatus comprises: a supporting mechanism 10 for supporting the oil immersed device; a swinging mechanism 20 for swinging the supporting mechanism and the oil immersed device supported thereby; and a vacuuming mechanism 30 for vacuuming inside the oil immersed device.

By using the vacuuming apparatus as shown in FIG. 1, bubbles may be advantageously removed from the oil immersed device which contains insulating oil and components immersed in the insulating oil inside. Particularly, a swinging mechanism is utilized to swing the supporting mechanism and the oil immersed device supported thereby, such that the bubbles attached onto the oil-immersed components may depart from those components and are then swung to the surface of the insulating oil, thus facilitating pumping the bubbles out by the vacuuming mechanism when vacuuming the oil immersed device. The vacuuming operation of the vacuuming mechanism may be carried out at the same time when the swinging operation of the swinging mechanism is performed, or carried out after the swinging operation of the swinging mechanism is finished, or may also be carried out alternately with the swinging operation of the swinging mechanism.

Vacuuming inside the oil immersed device by the vacuuming mechanism does not necessarily mean that a completely vacuum state is achieved inside the oil immersed device, but achieving a relatively vacuum state with respect to the external environment is just all right. For example, the operation of vacuuming inside the oil immersed device by the vacuuming mechanism may cause the gas pressure inside the oil immersed device slightly lower than the atmospheric pressure outside the oil immersed device, then the bubbles inside the oil immersed device can just be advantageously removed.

The vacuuming apparatus of the present embodiment may not only be applied to an oil immersed device such as a high voltage generator and an X-ray tube of a CT system, but also be applied to any other oil immersed devices containing components immersed in insulating oil. By using the vacuuming apparatus of the present embodiment, the bubbles attached onto the components in the oil immersed device can be removed without detaching the oil immersed device, thus reducing a possibility of the oil immersed device's breaking down. Such convenience allows the vacuuming apparatus of the present embodiment to be easily operated and to be usable in application sites of oil immersed device (e.g., a hospital operating a CT system and the like). In addition, the vacuuming apparatus of the present embodiment may be achieved by a simple structure (e.g., the example of FIG. 2 as described below), which makes it portable.

Preferably, the supporting mechanism may obliquely support the oil immersed device. Such supporting manner is beneficial for the bubbles attached to the oil-immersed components to float up to the surface of the insulating oil. For convenient operation, an opening through which insulating oil is poured into on the oil immersed device is typically located near one end on the top face of the oil immersed device. Further preferably, the supporting mechanism may obliquely support the oil immersed device at a position on which the opening of the oil immersed device is higher than other parts of the oil immersed device. Such supporting manner is beneficial for the bubbles to float up or swing to the vicinity of the opening, thus making it convenient for the vacuuming mechanism to vacuum the oil immersed device from the opening.

Preferably, an angle (or height) at which the supporting mechanism obliquely supports the oil immersed device can be adjusted. On one hand, the bigger the angle for oblique supporting is, the higher the opening of the oil immersed device is supported, and the more beneficial is for the bubbles to float up. On the other hand, when the swinging mechanism swings the supporting mechanism and the oil immersed device supported thereby, if the angle for oblique supporting is too big, the whole system will become unstable. Therefore, by reasonably designing and adjusting the angle at which the supporting mechanism obliquely supports the oil immersed device, a balance between the above two factors may be obtained and a desired effect of bubble-removal may be achieved.

Preferably, the swinging mechanism swings the supporting mechanism such that one or more side(s) move(s) in a vertical direction, for example, reciprocate(s) in the vertical direction or swing(s) in the vertical direction. In other words, the swinging mechanism may cause one or more side(s) of the supporting mechanism and the oil immersed device supported thereby to "jolt" up and down, thus beneficial for the bubbles attached to the oil-immersed components to depart from the components and float up to the surface of the insulating oil.

Figure 2:
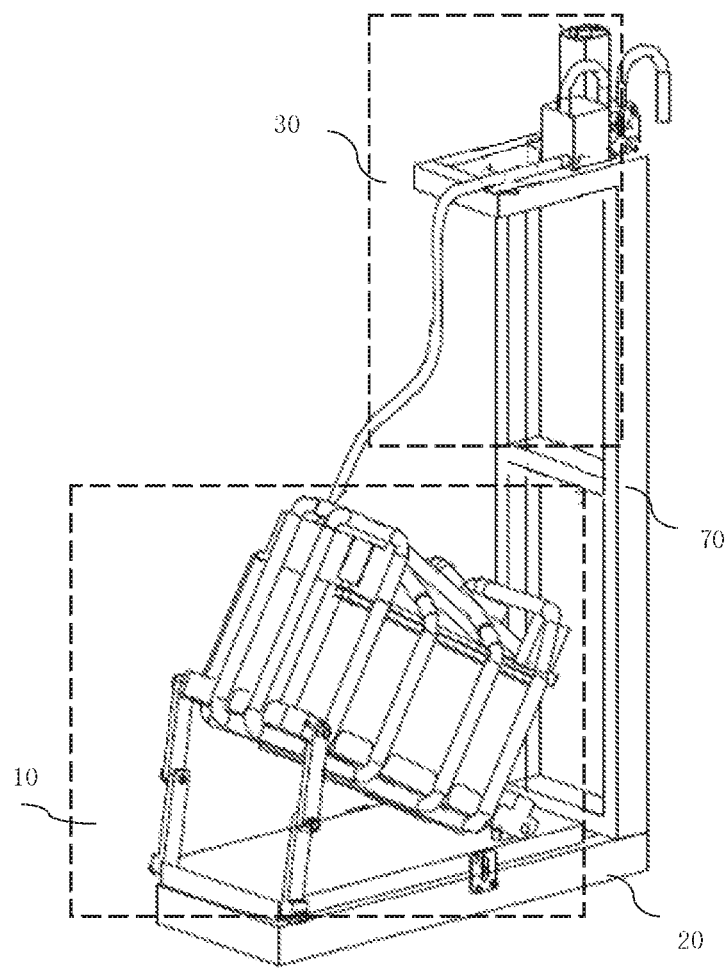
FIG. 2 is a perspective view showing an exemplary structure of the vacuuming apparatus according to the first embodiment of the present invention.

FIG. 2 illustrates an exemplary structure of the vacuuming apparatus according to the embodiments of the present invention. In addition to the supporting mechanism 10, the swinging mechanism 20 and the vacuuming mechanism 30 in FIG. 1, the exemplary structure of FIG. 2 further comprises an optional frame 70 for mounting the vacuuming mechanism 30. The exemplary vacuuming apparatus shown in FIG. 2 has a simple structure that is easily operated, and may be portable. For example, the vacuuming apparatus may be made in a manner such as using a detachable and foldable frame 70 so that it is easier to be carried. Note that the frame 70 can be omitted and the vacuuming mechanism 30 can be arranged in other manners, which will not be described in detailed herein. Exemplary structures of the mechanisms in the vacuuming apparatus of FIG. 2 will be described with reference to FIG. 3 to FIG. 8 in the following.

Figure 3:
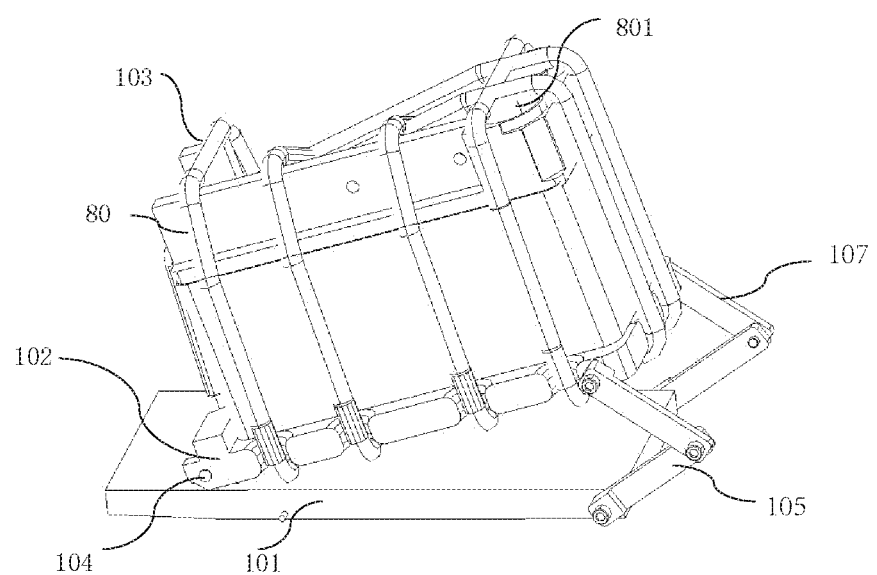
FIG. 3 is a schematic view of structure showing an exemplary structure of a supporting mechanism of the vacuuming apparatus of FIG. 2.

First, referring to FIG. 3 which illustrates an exemplary structure of the supporting mechanism 10 of the vacuuming apparatus of FIG. 2. As shown in FIG. 3, the supporting mechanism may comprise a baseboard 101, a mounting board 102 and a cage 103. The mounting board 102 is mounted on the baseboard 101 at one side via a rotatable tilting axis 104, and is supported on the baseboard 101 at the other side via two supporting bars 105 and 107. The cage 103 fixes an oil immersed device 80 to the mounting board 101. The cage may be made of flexible material, e.g., may be formed by simply crossing wear-resistant cables, as long as it can ensure a relative fixing between the oil immersed device and the mounting board. Each of the supporting bars 105 and 107 includes two parts, i.e., an upper part and a lower part. The two parts are connected with each other via a nut. When the nut between the upper part and the lower part of each supporting bar is not screwed tightly, an angle between the two parts may be adjusted to adjust an angle between the mounting board 102 and the baseboard 101, i.e., adjusting the angle for oblique supporting. When a desired angle is achieved between the upper part and the lower part of each of the supporting bars 105 and 107, the nut connecting these two parts may be screwed tightly so that the two supporting bars 105 and 107 are each fixed at the angle.

FIG. 3 also shows an opening 801 of the oil immersed device 80. As shown in FIG. 3, the oil immersed device 80 is obliquely supported, such that the end on which the opening 801 resides is higher than other parts of the oil immersed device 80, thus it is beneficial for the bubbles to rise to the opening and be pumped out by the vacuuming mechanism from the opening. There is a lid for sealing (not shown in the figure) on the opening 801.

The exemplary structure of FIG. 3 is only used to explain one preferred embodiment of the supporting mechanism, and is not intended to make any restriction. Taught by the present Description, in addition to the exemplary structure of FIG. 3, the person skilled in the art may also conceive any other appropriate structure of the supporting mechanism. For example, a box having a tilting internal surface may be used as the supporting mechanism. The tilting internal surface just provides oblique supporting for the oil immersed device.

Figure 4:
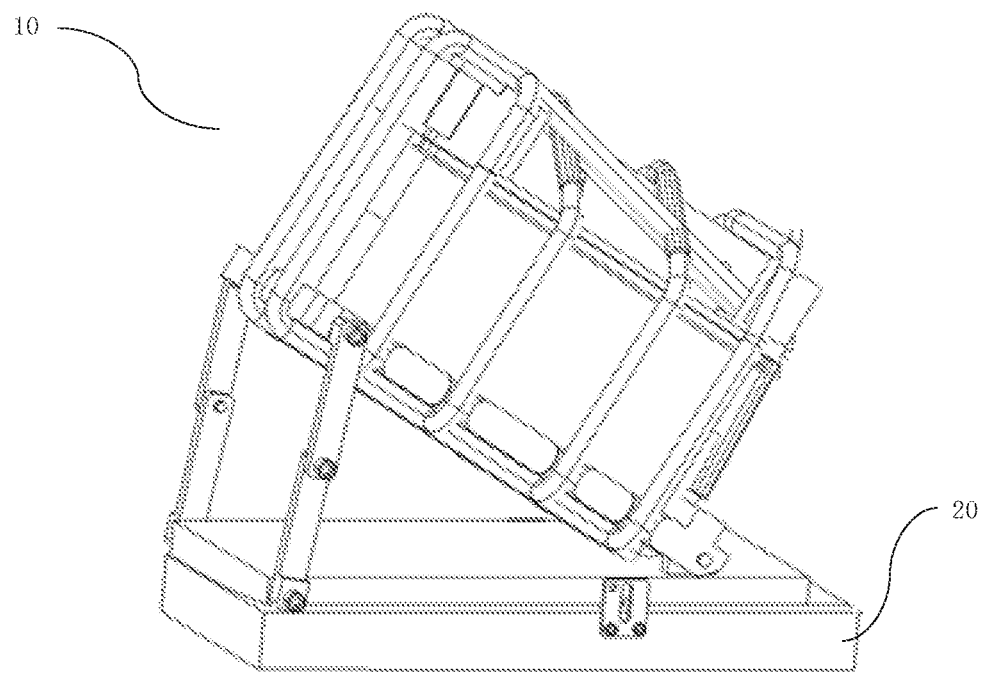
FIG. 4 to FIG. 7 are schematic views of structure showing an exemplary structure of a swinging mechanism of the vacuuming apparatus of FIG. 2.
Figure 5:
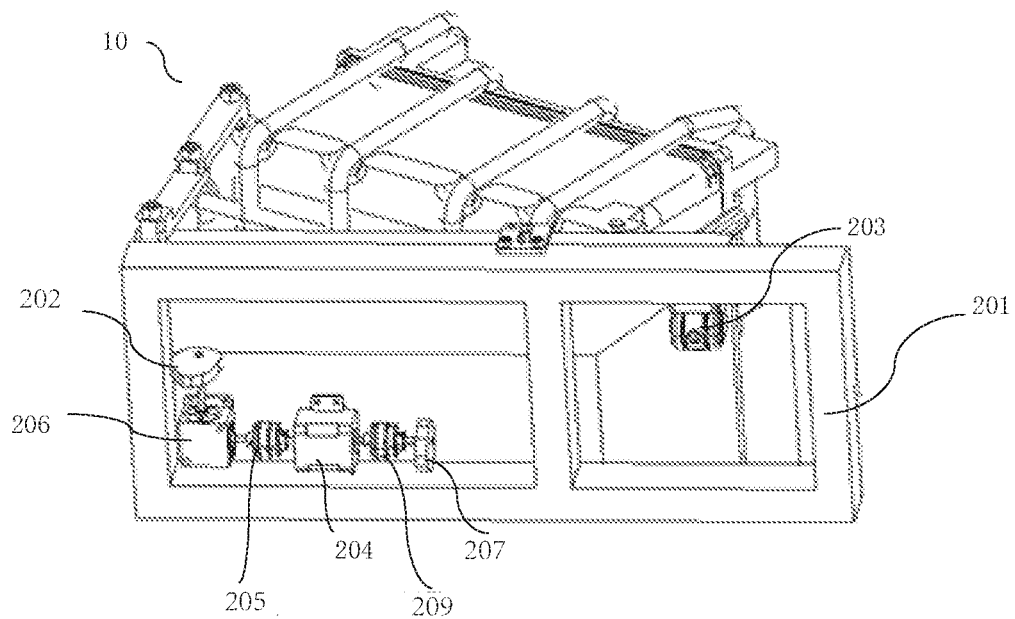

Next, referring to FIG. 4 to FIG. 7 which show an exemplary structure of the swinging mechanism 20 of the vacuuming apparatus of FIG. 2. FIG. 4 shows an exemplary relative position relationship between the supporting mechanism 10 and the swinging mechanism 20, wherein the swinging mechanism 20 is located below the supporting mechanism 10. FIG. 5 schematically shows the exemplary structure of the swinging mechanism 20 in a different angle of view from that of FIG. 4. As shown in FIG. 5, the swinging mechanism may comprise: a pedestal 201 below the supporting mechanism 10; a first support 202 arranged on the pedestal 201 below a first side of the supporting mechanism 10 to support the supporting mechanism 10, wherein a supporting height of the first support 202 can be changed; a second support 207 arranged on the pedestal 201 below a second side of the supporting mechanism 10 to support the supporting mechanism 10, wherein a supporting height of the second support 207 can be changed, the second side being adjacent to the first side; a connector 203 arranged on the pedestal 201 below an end portion (or corner) between a third side and a fourth side of the supporting mechanism 10 and configured to connect the supporting mechanism 10 with the pedestal 201 in a manner that the two have motion redundancies with each other, wherein the third side and the fourth side are opposite to the first side and the second side respectively; and a driving component 204 coupled with the first support 202 and the second support 207, and configured to drive the supporting height(s) of the first support 202 and/or the second support 207 to change, causing movement(s) of the first side and/or the second side of the supporting mechanism 10 in a vertical direction.

As an example, the first support 202 and the second support 207 shown in FIG. 5 are implemented by cams and the driving component 204 may be implemented by a biaxial motor. As an example, FIG. 5 illustrates an eccentric cam having a round outline. Alternatively, cams having any other appropriate outlines such as ellipse may also be utilized, as long as such cams may provide different supporting heights when rotating.

Figure 6:
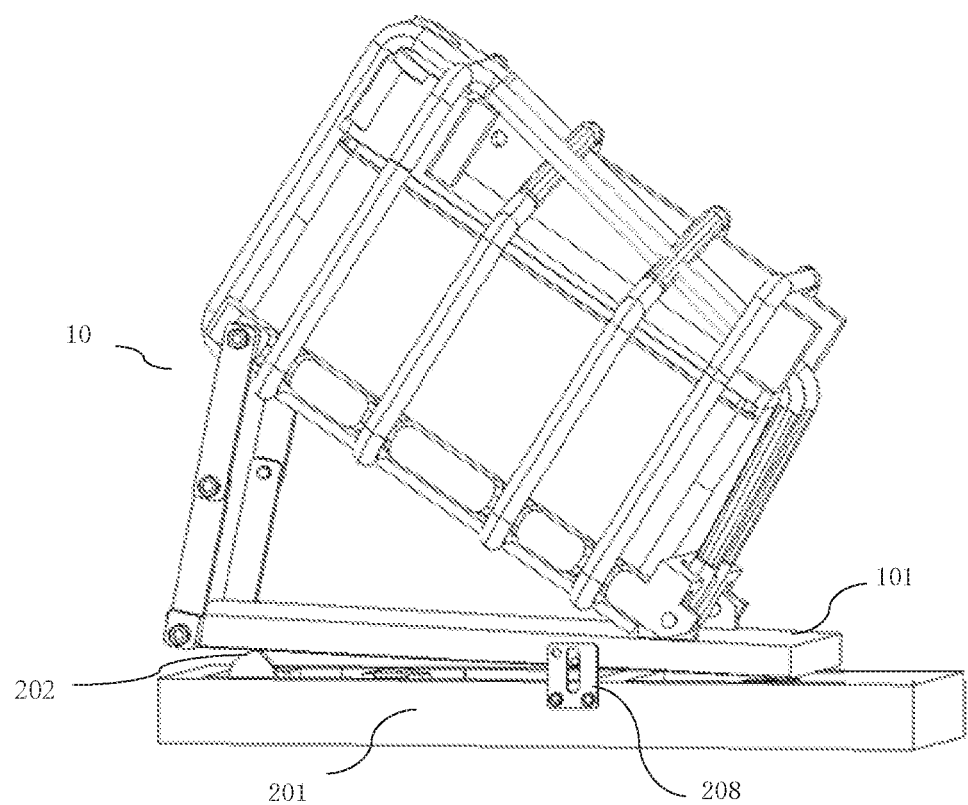

As shown in FIG. 5, an axis of the first cam 202 is placed along a direction of the first side of the supporting mechanism 10, and one output of the biaxial motor 204 is coupled to the axis of the cam 202 via an optional clutch 205 and an optional speed variable mechanism 206 (which will be described in details later) to drive the cam 202 for rotation. The eccentric structure of the cam 202 causes its supporting height for the first side of the supporting mechanism 10 to change when the cam 202 rotates. Specifically, in the example of FIG. 5, when the axis position of the eccentric cam 202 is the highest (the cam 202 is in the state as shown in FIG. 5), the supporting height for the mechanism 10 is the minimum, while when the axis position of the eccentric cam 202 is the lowest (the cam 202 rotates for a half cycle from the state as shown in FIG. 5), the supporting height for the mechanism 10 is the maximum. Correspondingly, as the cam 202 rotates for more cycles, the first side of the supporting mechanism 10 reciprocates in the vertical direction. As an example, FIG. 6 shows a state in which the cam 202 at the first side rotates, causing the first side of the supporting mechanism 10 to move in the vertical direction (sometimes referred to as X-axis movement in the following).

Figure 7:
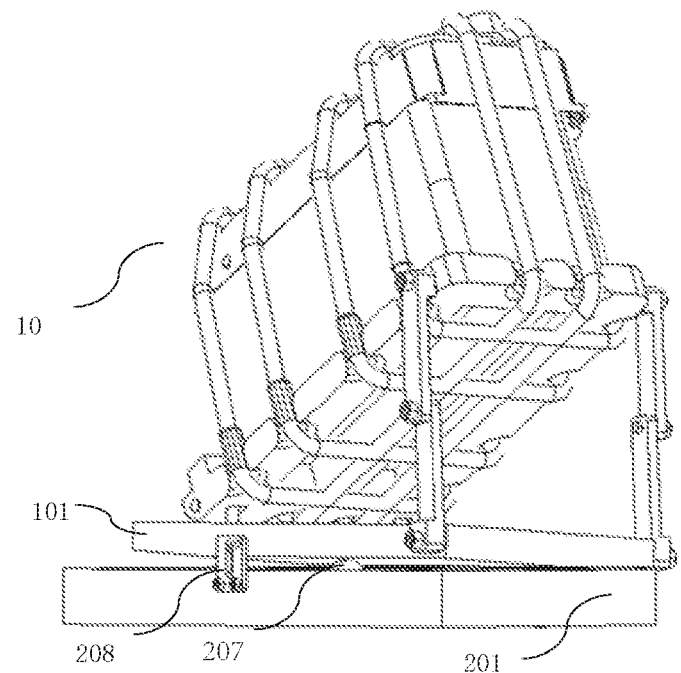

Similarly, an axis of the second cam 207 is placed along a direction of the second side of the supporting mechanism 10, and the other output of the biaxial motor 204 is coupled to the axis of the cam 207 via an optional clutch 209 (which will be described in details later) to drive the cam 207 for rotation. The eccentric structure of the cam 207 causes its supporting height for the second side of the supporting mechanism 10 to change when the cam 207 rotates, thus causing the second side of the supporting mechanism 10 to reciprocate in the vertical direction. As an example, FIG. 7 shows a state in which the cam 207 at the second side rotates, causing the second side of the supporting mechanism 10 to move in the vertical direction (sometimes referred to as Y-axis movement in the following).

Preferably, as shown in FIG. 5, the cams 202 and 207 are arranged at positions below centers of the first side and the second side of the supporting mechanism 10 respectively to provide a good support for the supporting mechanism.

In the present example, the connector 203 is arranged on the pedestal 201 below the end portion (or corner) between the third side and the fourth side of the supporting mechanism 10 to connect the supporting mechanism 10 with the pedestal 201 in a manner that the two have motion redundancies with each other. In this way, when the rotations of the cams 202 and 207 cause the first side and second side of the supporting mechanism 10 to move in the vertical direction, the connector 203 allows a certain relative movement between the supporting mechanism 10 and the pedestal 201. As an example, the connector 203 may be a flexible connector, such as hinges with a certain length; or a rotatable connector that can rotate in different directions, such as a cardan joint and the like. By appropriately selecting the connector 203, a motion redundancy remains between the supporting mechanism 10 and the pedestal 201 that permits the swinging mechanism 20 to swing the supporting mechanism while preventing the supporting mechanism 10 from swinging to depart from the pedestal 201.

Preferably, as shown in FIG. 5, the motor 204 as the driving component is disconnectably coupled with the cams 202, 207 as the first support and the second support via the corresponding clutches 205, 209. In this way, the driving component may independently drive one support to change its height, and may also simultaneously drive two supports to change their heights, thus achieving reciprocating or swinging of one side or two sides of the supporting mechanism in the vertical direction, thereby obtaining different swinging modes.

Moreover, FIG. 5 further shows the speed variable mechanism 206 such as a gear box, which is coupled between the output of the motor 204 and the cam 202. By arranging a speed variable mechanism at one output of the biaxial motor 204 while not arranging at the other output of the biaxial motor 204, the two cams may be provided with different driving speeds, thus the mode of swinging is changed. In addition, the rotation speed of the motor 204 may be relatively higher. If the rotation speed exceeds a speed such as a desired operation speed of the mechanical components of the cam, then a speed variable mechanism may be arranged at both the two outputs of the motor 204 so as to provide an appropriate driving speed for the cam.

FIG. 6 and FIG. 7 further show a position limiter 208 on the pedestal 201 of the swinging mechanism, which restricts a motion range of the supporting mechanism 10 when the swinging mechanism swings the supporting mechanism 10, so as to prevent the supporting mechanism 10 from swinging too much to tumble down. The position limiters 208 in the present example are arranged on two opposite sides (e.g., the first side and the third side in FIG. 5) of the pedestal 201 respectively, which are in forms of tongue pieces having openings. A corresponding rode may be mounted on a corresponding position of the baseboard 101 of the supporting mechanism 10, which goes deep into the opening of the tongue piece to restrict the motion range of the baseboard 101, thereby restricting the motion range of the supporting mechanism 10.

The person skilled in the art may understand that any other forms of position limiters can be utilized as long as they can appropriately restrict the motion range of the supporting mechanism 10. For example, hinges with a suitable length may be utilized to be connected between the pedestal 201 of the swinging mechanism and the baseboard 101 of the supporting mechanism 10 as a position limiter. Further for example, a U-shaped rod may also be used as a position limiter, with one end of the U-shaped rod mounted on a lower side of the pedestal 201 and the other end located above the baseboard 101 with its U-shaped opening placed horizontally, thereby restricting the motion range of the baseboard 101.

Although FIG. 4 to FIG. 7 illustrate exemplary structures of the swinging mechanism, those exemplary structures are only used to explain a preferred embodiment of the swinging mechanism, not intended to make any restriction. Taught by the present Description, in addition to the exemplary structures of FIG. 4 to FIG. 7, the person skilled in the art may also conceive any other appropriate structure of the supporting mechanism.

For instance, in an alternative example, the swinging mechanism may comprise: a pedestal below the supporting mechanism; a support arranged on the pedestal below a first side of the supporting mechanism to support the supporting mechanism, wherein a supporting height of the support can be changed; a connector arranged on the pedestal below a second side of the supporting mechanism and configured to connect the supporting mechanism with the pedestal in a manner that the two have motion redundancies with each other, the second side being opposite to the first side; and a driving component coupled with the support and driving the supporting height of the support to change, causing a movement of the first side of the supporting mechanism in the vertical direction.

In the present example, the pedestal, the support and the driving component of the swinging mechanism may respectively utilize structures similar to the corresponding components in the examples described by referring to FIG. 4 to FIG. 7, with the difference lying in a motor of the present example only needs one output when the motor is used as the driving component (i.e., a single-axis motor may be utilized). The connector of the present example may also utilize a structure similar to the connector of the example described by referring to FIG. 4 to FIG. 7. The difference lies in that in addition to the flexible connector and the rotatable connector that can rotate in different directions, the connector of the present example may also utilize pivot parts, for example, a shaft. In such a case, when the driving component drives the supporting height of the support at the first side of the supporting mechanism to change thereby causing the first side of the supporting mechanism to move in the vertical direction, a shaft arranged at the second side opposite to the first side of the supporting mechanism allows the first side of the supporting mechanism to be rotatable around the shaft within a certain range.

For another example, in a simplified example, the supporting mechanism may be hung on the frame by using cables, i.e., providing a simplified swinging mechanism. By shaking the supporting mechanism by hands, the supporting mechanism is provided with an initial velocity to make the supporting mechanism swing.

Figure 8:
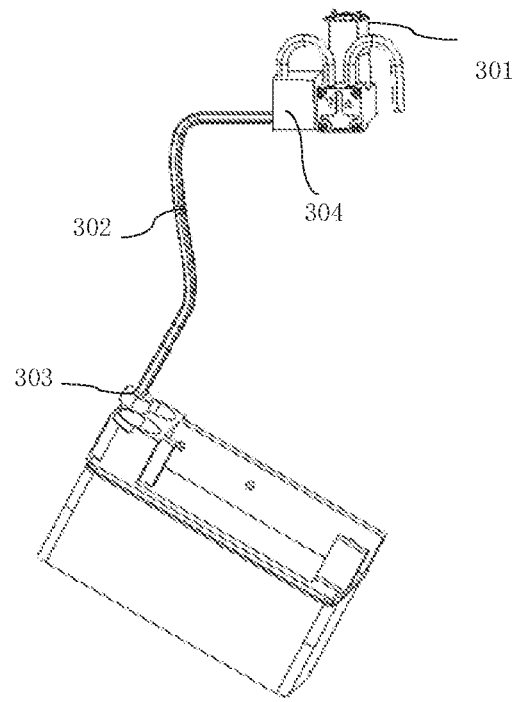
FIG. 8 is a schematic view of structure showing an exemplary structure of a vacuuming mechanism of the vacuuming apparatus of FIG. 2.

FIG. 8 shows an exemplary structure of the vacuuming mechanism of the vacuuming apparatus of FIG. 2. As shown in FIG. 8, the vacuuming mechanism 30 may comprise: a vacuum pump 301; a first pipeline 302 connected between the vacuum pump 301 and the oil immersed device 80; and a filter 303 arranged between the first pipeline 302 and the oil immersed device. The filter 303 may be implemented by utilizing, for example, a filtering film and the like arranged on the end portion of the first pipeline 302, the figure only schematically showing its arrangement position. The filter allows passage of the air while blocks the insulating oil, such that when the vacuum pump 301 vacuums the oil immersed device 80, the insulating oil in the oil immersed device 80 is prevented from being pumped into the pipeline 302. Furthermore, FIG. 8 also illustrates an optional vacuum chamber 304, which is arranged between the vacuum pump 301 and the first pipeline 302, facilitating obtaining a better vacuuming effect.

The first embodiment of the present invention has been described by referring to FIG. 1 to FIG. 8 as mentioned above. By using the vacuuming apparatus of the present embodiment, the bubbles in the oil immersed device may be removed. When the oil immersed device operates in a high voltage condition, sparking caused by bubbles can be avoided, thus extending service life of the oil-immersed components and decreasing breakdown of the oil immersed device.

Figure 9:
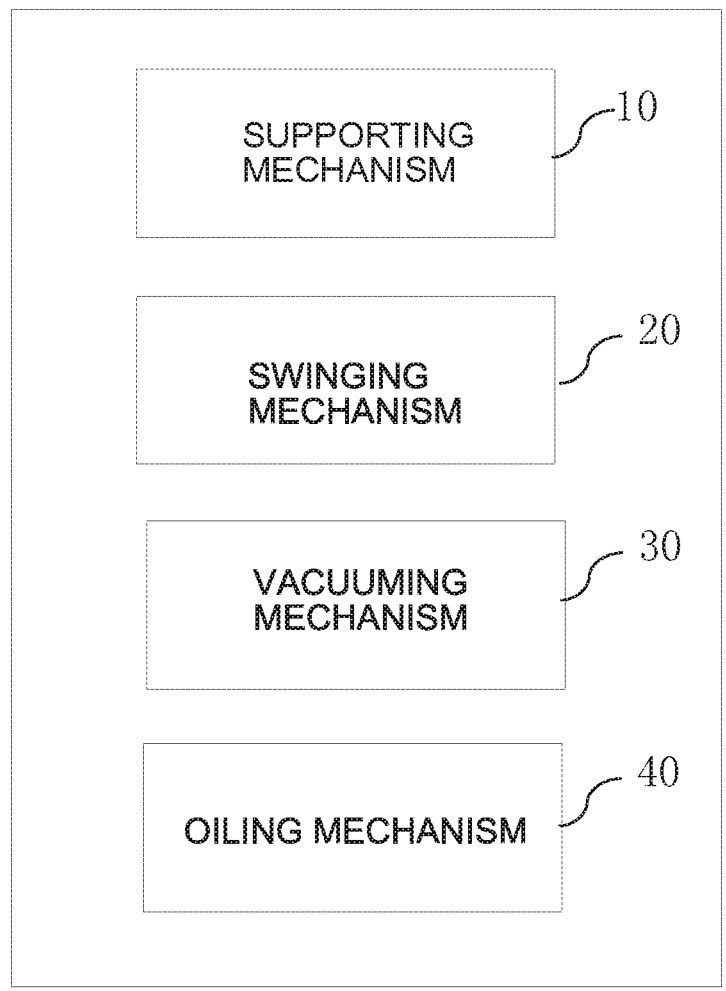
FIG. 9 is a schematic block diagram of a vacuuming apparatus according to a second embodiment of the present invention.

FIG. 9 shows a schematic block diagram of a vacuuming apparatus according to a second embodiment of the present invention. The difference between the vacuuming apparatus of the second embodiment of FIG. 9 and the vacuuming apparatus of the first embodiment of FIG. 1 lies in that in addition to the supporting mechanism 10, the swinging mechanism 20 and the vacuuming mechanism 30 in FIG. 1, the vacuuming apparatus of FIG. 9 further comprises an oiling mechanism 40 for oiling the oil immersed device.

Since bubbles are generated in the insulating oil, oil loss appears in a tank. By using the oiling mechanism 40, the oil immersed device may be oiled to be full of oil, thus bubbles in the insulting oil and sparking that may be caused thereby can be further avoided.

Figure 10:
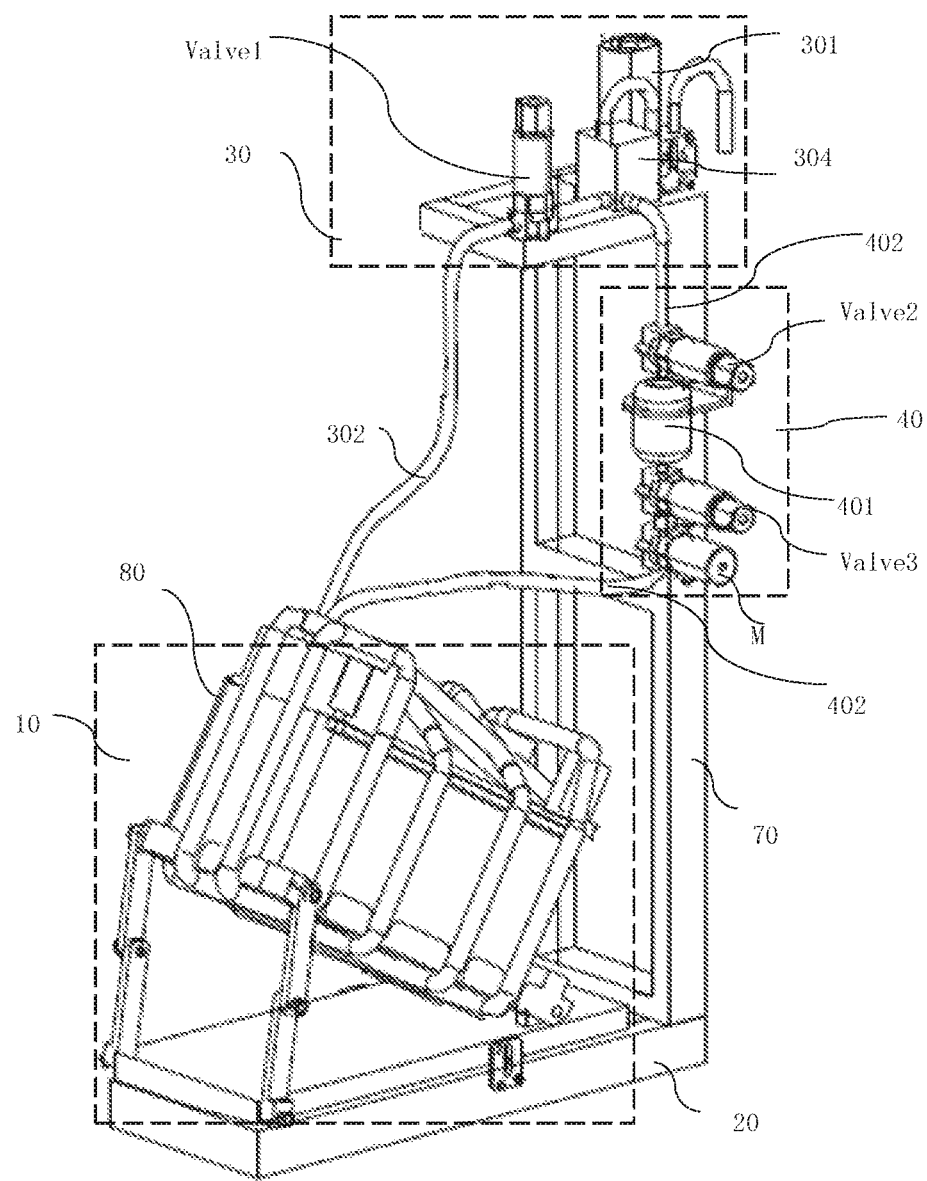
FIG. 10 is a perspective view showing an exemplary structure of the vacuuming apparatus of FIG. 9.

FIG. 10 shows an exemplary structure of the vacuuming apparatus of FIG. 9. The difference between the exemplary structure of FIG. 10 and the exemplary structure of FIG. 2 lies in that in addition to the supporting mechanism 10, the swinging mechanism 20, the vacuuming mechanism 30 and the optional frame 70 in FIG. 2, the exemplary structure of FIG. 10 further comprises the oiling mechanism 40. Moreover, since cooperation with the oiling mechanism 40 is needed, the vacuuming mechanism 30 in FIG. 10 may have a mechanism slightly different from the vacuuming mechanism of FIG. 8.

Specifically, in the present example, in addition to the vacuum pump 301, the first pipeline 302, the filter (not shown in FIG. 10) and the optional vacuum chamber 304 of FIG. 8, the vacuuming mechanism 30 of FIG. 10 may further comprise an optional first control valve Valve 1 for controlling connection and disconnection of the first pipeline 302. When the oiling mechanism 40 oils the oil immersed device 80, the first control valve Valve 1 is closed to make the first pipeline 302 disconnected so that insulating oil will not be injected into the first pipeline 302. Note that, to some extent, the filter 303 has avoided injection of insulating oil into the first pipeline 302, therefore the first control valve Valve 1 is an optional component, which further ensures no insulating oil will be injected into the first pipeline 302.

In addition, as shown in FIG. 10, the oiling mechanism 40 may comprise: an oil storage tank 401 for storing insulating oil; a second pipeline 402 connected between the oil storage tank 401 and the vacuum pump 301 and between the oil storage tank 401 and the oil immersed device 80; a second control valve Valve 2 for controlling connection and disconnection of a portion of the second pipeline 402, between the oil storage tank 401 and the vacuum pump 301; a third control valve Valve 3 for controlling connection and disconnection of a portion of the second pipeline 402, between the oil storage tank 401 and the oil immersed device 80. FIG. 10 further illustrates an optional flowmeter M, which is connected near the third control valve Valve 3 and may be used to measure the amount of insulating oil injected into the oil immersed device 80.

The arrangements of the second control valve Valve 2 and the third control valve Valve 3 together with the first control valve Valve 1 may allow the oiling mechanism 40 and the vacuuming mechanism 30 to be used cooperatively. For example, when the vacuum pump of the vacuuming mechanism 30 operates, the first control valve Valve 1 may be opened to make the first pipeline connected, and the second control valve Valve 2 and the third control valve Valve 3 may be closed to make the second pipeline disconnected, to prevent the insulating oil in the oil storage tank 401 from being absorbed to the first pipeline 302 or the vacuum chamber 304. When the oiling mechanism 40 oils the oil immersed device 80, the third control valve Valve 3 may be opened to make the portion of the second pipeline between the oil storage tank 401 and the oil immersed device 80 connected, and the first control valve Valve 1 and the second control valve Valve 2 may be closed to make the first pipeline and the portion of the second pipeline between the oil storage tank 401 and the vacuum pump 301 disconnected, to prevent the insulating oil in the oil storage tank 401 from entering into the first pipeline 302 or the vacuum chamber 304.

The second embodiment of the present invention has been described by referring to FIG. 9 to FIG. 10 as mentioned above. By using the vacuuming apparatus of the present embodiment, the oil immersed device 80 may be oiled to be full of oil so as to avoid loss of insulating oil. The oil immersed device such as the X-ray tube in a CT system is not absolutely sealed, and these oil immersed devices may have a motion or movement (for example, the X-ray tube in the CT system may have a rotation motion) when in use, so the loss of insulating oil may cause appearance of bubbles in the insulating oil of the oil immersed device again after vacuuming. Therefore, by utilizing the vacuuming apparatus of the present example, the oil immersed device may be oiled to be full of oil, thus appearance of bubbles and sparking that may be caused thereby in the insulating oil can be further avoided.

Figure 11:
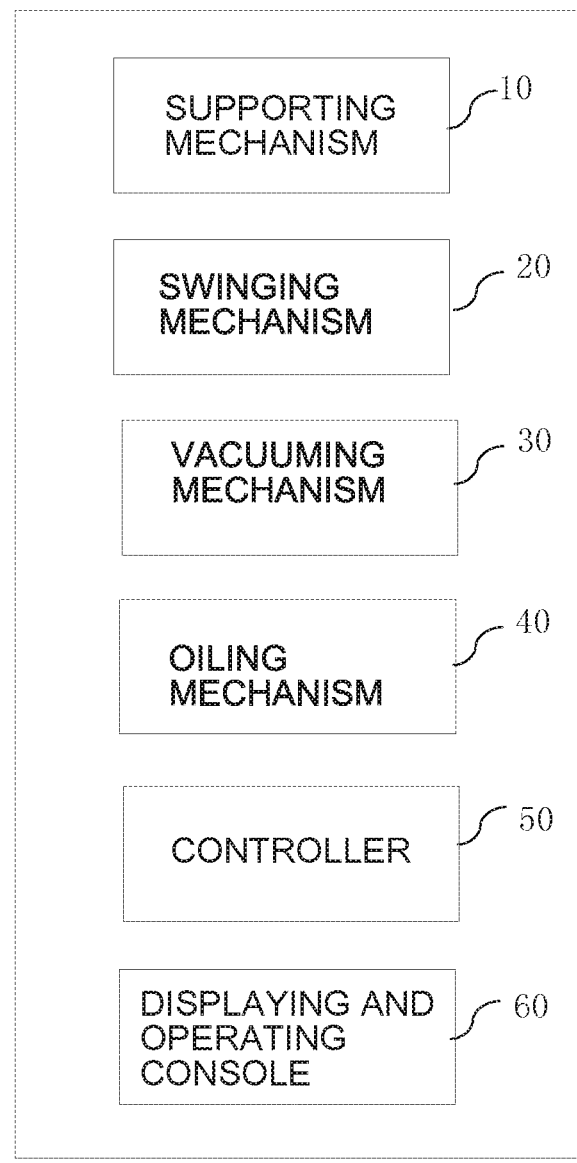
FIG. 11 is a schematic block diagram of a vacuuming apparatus according to a third embodiment of the present invention.
Figure 12:
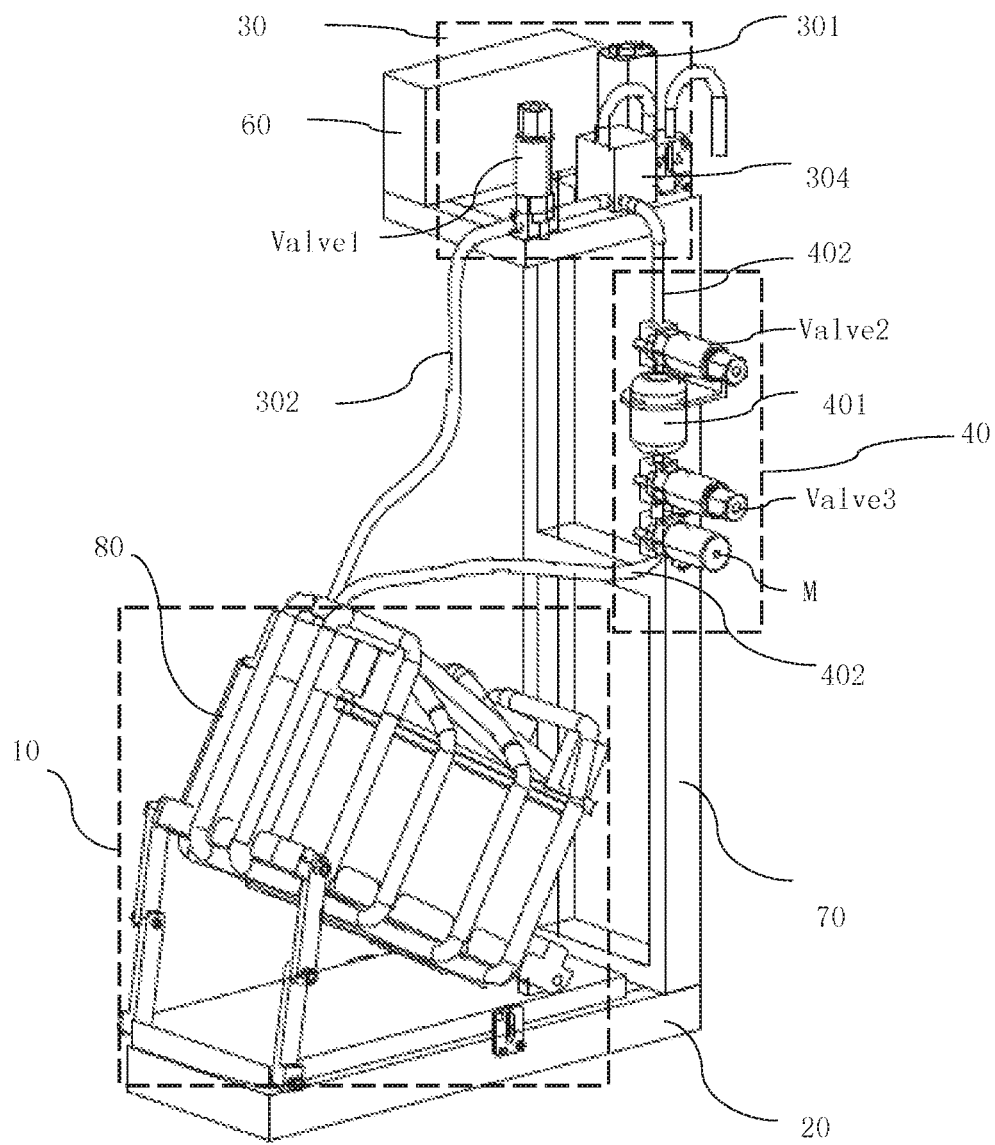
FIG. 12 is a perspective view showing an exemplary structure of the vacuuming apparatus of FIG. 11.

FIG. 11 shows a structural block diagram of a vacuuming apparatus according to a third embodiment of the present invention. The difference between the vacuuming apparatus of the third embodiment of FIG. 11 and the vacuuming apparatus of the second embodiment of FIG. 9 lies in that in addition to the supporting mechanism 10, the swinging mechanism 20, the vacuuming mechanism 30 and the oiling mechanism 40 in FIG. 9, the vacuuming apparatus of FIG. 11 further comprises a controller 50 and an optional displaying and operating console 60. The controller 50 may control the operations of the supporting mechanism 10, the swinging mechanism 20, the vacuuming mechanism 30, the oiling mechanism 40 (and the optional displaying and operating console 60). The displaying and operating console 60 may comprise a display screen and an operation region for displaying the operation state of the vacuuming apparatus and facilitating the user's input of operation commands FIG. 12 shows an exemplary structure of the vacuuming apparatus of FIG. 11. The difference between the exemplary structure of FIG. 12 and the exemplary structure of FIG. 10 lies in that in addition to the supporting mechanism 10, the swinging mechanism 20, the vacuuming mechanism 30, the oiling mechanism 40 and the optional frame 70 in FIG. 10, the vacuuming apparatus of FIG. 12 further comprises a controller 50 (not shown in the figure) and an optional displaying and operating console 60.

The controller 50 may be implemented by utilizing various existing processors or chips, etc., such as CPU, MCU and the like, and is connected with the corresponding components of the supporting mechanism 10, the swinging mechanism 20, the vacuuming mechanism 30 and the oiling mechanism 40 so as to control the operations of these mechanisms.

In one preferred embodiment, in addition to being connected with the supporting mechanism 10, the swinging mechanism 20, the vacuuming mechanism 30, the oiling mechanism 40 and the corresponding components thereof, the controller 50 may also be connected with the displaying and operating console 60 for receiving the user's input and displaying the operation state so as to achieve the control for the above mechanisms and their components according to the user's input.

Figure 13:
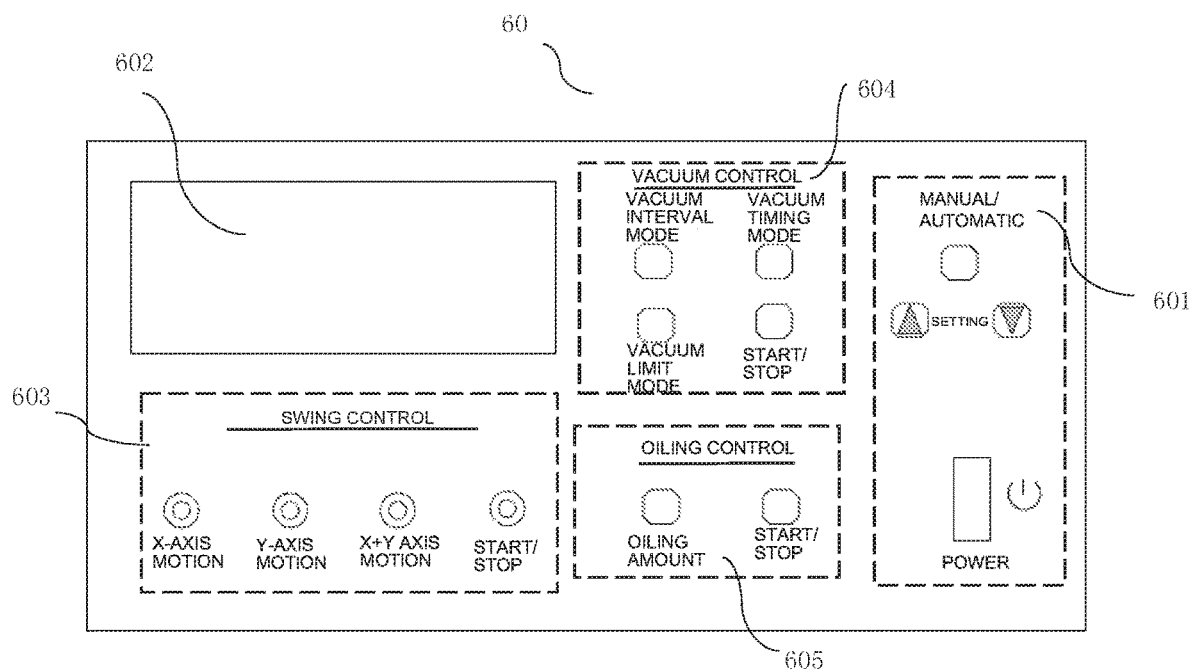
FIG. 13 is a schematic diagram showing an exemplary exterior of a displaying and operating console of the vacuuming apparatus of FIG. 12.

FIG. 13 shows a schematic exterior of the displaying and operating console 60. As shown in FIG. 13, a right part of the displaying and operating console 60 comprises a main control area 601 indicated in a dotted box including a power button of the vacuuming apparatus, a manual/automatic mode selection button, and up and down setting buttons for adjusting parameter values. A left part of the displaying and operating console 60 comprises a parameter display area 602 for displaying values of corresponding parameters. The displaying and operating console 60 is further provided with a swing control area 603, a vacuum control area 604 and an oiling control area 605 between the main control area 601 and the parameter display area 602.

After the vacuuming apparatus is started by pressing down the power button of the main control area 601, the user can allow the controller 50 to output corresponding signals to a memory (not shown in the figure) of the vacuuming apparatus via the up and down setting buttons of the displaying and operating console 60 so as to adjust values of various operation parameters. Such parameters comprise, for example, but are not limited to a desired swinging time of the swinging mechanism, a desired duration for vacuuming operation of the vacuuming mechanism, an interval/range of desired degree of vacuum to be pumped, a limit value of desired degree of vacuum to be pumped, a desired oiling amount of the oiling mechanism and the like. The setting values of these parameters may be displayed in the parameter display area 602 so as to facilitate user's adjustment. The above parameter setting or adjusting may be carried out immediately after the vacuuming apparatus is started up, or may also be carried out at appropriate times during operation of the vacuuming apparatus, which will not be described in details herein.

Furthermore, the present values of various operation parameters, for example, the actual swinging time of the swinging mechanism, the actual duration for vacuuming operation, the actual degree of vacuum to be pumped (e.g., acquired by a corresponding sensor in the oil immersed device), the actual oiling amount of the oiling mechanism (e.g., acquired by such as the flowmeter M as shown in FIG. 10) and the like may be displayed in the parameter display area 602 along with the operation of the vacuuming apparatus.

By pressing down the manual/automatic mode selection button of the displaying and operating console 60, the user may switch between a manual mode and an automatic mode.

In an automatic mode, under the control of the controller 50, the control valve Valve 1 may be automatically opened and the control valves Valve 2 and Valve 3 may be automatically closed, thereby starting up the vacuuming mechanism and the swinging mechanism to perform operations of vacuuming and swinging, and the operations of vacuuming and swinging are stopped at appropriate timing (for example, when achieving the desired swinging time of the swinging mechanism or achieving the limit value of desired degree of vacuum to be pumped). Thereafter, the controller 50 may judge whether the oil immersed device needs to be oiled. For instance, a weight of the oil immersed device may be obtained by arranging a sensor on the supporting mechanism to determine whether the oil immersed device is oiled to be full of oil. When it is judged not to be full of oil and thus oiling is needed, the controller 50 may close the control valve Valve 1 and open the control valve Valve 3 (the control valve Valve 2 kept closed), to make the oiling mechanism 40 start oiling and stop oiling operation at appropriate timing (for example, when being full of oil or after achieving the desired oiling amount), thereby stopping the operation of the vacuuming apparatus. When it is judged that the oil immersed device has been oiled to be full of oil and thus oiling is not needed, the controller 50 may stop the operation of the vacuuming apparatus.

On the other hand, in a manual mode, the user may start the vacuuming mechanism and the swinging mechanism by start/stop buttons of the swing control area 603 and the vacuum control area 604, while opening the control valve Valve 1 and closing the control valves Valve 2 and Valve 3 to perform the operations of vacuuming and swinging, and stop the operations of vacuuming and swinging by these buttons manually at appropriate timing (for example, when achieving the desired swinging time or achieving the limit value of desired degree of vacuum to be pumped). Then the user judges whether the oil immersed device needs to be oiled. For example, from the weight of the oil immersed device that is acquired by the sensor on the supporting mechanism (the weight may be displayed on the parameter display area), it may be judged whether the oil immersed device is oiled to be full of oil, so as to judge whether oiling is needed. When it is judged that oiling is needed, the user may manually allow the oiling mechanism 40 to start oiling by a start/stop button of the oiling control area 605, while closing the control valve Valve 1 and opening the control valves Valve 3 (the control valve Valve 2 kept closed), and stop oiling operation at appropriate timing (for example, when achieving the desired oiling amount of the oiling mechanism) and stop the operation of the vacuuming apparatus by the power button of the main control area 601. When it is judged that oiling is not needed, the operation of the vacuuming apparatus may be stopped directly by the power button of the main control area 601.

In addition to the above general operation flow, the user may also input specific operation commands to the swinging mechanism, the vacuuming mechanism and the oiling mechanism on the displaying and operating console 60 to make the controller 50 perform corresponding controlling.

Specifically, the displaying and operating console 60 is provided with corresponding buttons on the swing control area 603 for the user to input control on the swinging of the swinging mechanism, including starting/stopping of swinging and specific modes of swinging as described above. As an example, the swinging modes may comprise an X-axis motion, a Y-axis motion and an X+Y axis motion.

The controller 50 may make corresponding control on the swinging mechanism according to the user's input on the swing control area 603. For example, when the user presses down the start/stop button of the swing control area 603 for the first time to start swinging, the controller may output a corresponding signal to the swinging mechanism, e.g., to make the motor 204 of the swinging mechanism as shown in FIG. 5 start to rotate. When the user presses down the "X-axis motion" button of the swing control area 603, the controller 50 may output a corresponding signal to the swinging mechanism, e.g., to make the first clutch 205 of the swinging mechanism as shown in FIG. 5 in a connection state. When the user presses down the "Y-axis motion" button, the controller 50 may output a corresponding signal to the swinging mechanism, e.g., to make the second clutch 209 of the swinging mechanism as shown in FIG. 5 in a connection state. When the user presses down the "X+Y axis motion" button, the controller 50 may output a corresponding signal to the swinging mechanism, e.g., to make the two clutches 205, 209 both in a connection state. Correspondingly, the desired cam 202 and/or 207 may be driven by the output of the motor 204 to rotate, causing the corresponding motion of the supporting mechanism.

Furthermore, the displaying and operating console 60 is provided with corresponding buttons on the vacuum control area 604 for the user to input control on the vacuuming operation of the vacuuming mechanism, including starting/stopping of vacuuming and specific modes of vacuuming as described above. As an example, the vacuuming modes may comprise a vacuum interval mode, a vacuum limit mode and a vacuum timing mode. For example, the "vacuum interval mode" means the vacuum pump vacuums the oil immersed device to a certain interval of degree of vacuum under the control of the controller, the "vacuum limit mode" means the vacuum pump vacuums the oil immersed device to a desired limit value of degree of vacuum under the control of the controller, and the "vacuum timing mode" means the vacuum pump continuously vacuums the oil immersed device during a desired period of time (desired timing) under the control of the controller.

Preferably, in order to achieve the above modes, the vacuuming mechanism may further comprise a corresponding measuring device (such as a vacuum gauge, an altitude meter for measuring the altitude or an atmospheric pressure sensor and the like) for measuring the degree of vacuum in the oil immersed device and other related parameters (when necessary), so as to cooperate with the control of the controller 50. For example, the vacuuming mechanism may measure the altitude at which the oil immersed device is located, calculate the desired degree of vacuum to be achieved according to the atmospheric pressure corresponding to the altitude, and then set the desired interval or limit value of degree of vacuum, so as to cooperate with the control of the controller 50, thus achieving the desired interval or limit value of degree of vacuum and the like by controlling the vacuum pump and the corresponding control valves.

Furthermore, the displaying and operating console 60 is provided with corresponding buttons on the oiling control area 605 for the user to input control on the oiling operation of the oiling mechanism, including starting/stopping of oiling and oiling amount as described above. Correspondingly, according to the user's input, the controller 50 may control the oiling amount of the oiling mechanism and the like by combining with, for example, the reading of the flowmeter M as shown in FIG. 10 through controlling opening and closing of the control valves Valve 1, Valve 2 and Valve 3 and the like.

The schematic operation combining with the controller 50 and the displaying and operating console 60 in the present embodiment has been schematically described by referring to FIG. 13 as mentioned above. Taught by the present Description, the person skilled in the art may implement the specific connection relationships between the controller 50 and the supporting mechanism 10, the swinging mechanism 20, the vacuuming mechanism 30, the oiling mechanism 40 and the components thereof, and the displaying and operating console 60, which will not be described in details herein.

The third embodiment of the present invention has been described by referring to FIG. 11 to FIG. 13 as mentioned above. By using the vacuuming apparatus of the present embodiment, the operation of the vacuuming apparatus may be flexibly controlled, thus achieving the desired vacuuming effect.

Some exemplary embodiments have been described in the above. However, it should be understood that various modifications may be made thereto. For example, if the described techniques are carried out in different orders, and/or if the components in the described system, architecture, apparatus or circuit are combined in different ways and/or replaced or supplemented by additional components or equivalents thereof, proper results may still be achieved. Accordingly, other implementation also falls within a protection range of the Claims.

What is claimed is:

1. A vacuuming apparatus for removing bubbles from an oil immersed device containing components immersed in insulating oil, the vacuuming apparatus comprising:
   a supporting mechanism for supporting the oil immersed device;
   a swinging mechanism for swinging the supporting mechanism and the oil immersed device supported thereby; and
   a vacuuming mechanism for vacuuming inside the oil immersed device; wherein the supporting mechanism obliquely supports the oil immersed device; and wherein the supporting mechanism obliquely supports the oil immersed device at a position on which an opening of the oil immersed device is higher than other parts of the oil immersed device.

2. The vacuuming apparatus of claim 1, wherein an angle at which the supporting mechanism obliquely supports the oil immersed device can be adjusted.

3. The vacuuming apparatus of claim 1, wherein the swinging mechanism comprises:
   a pedestal below the supporting mechanism;
   a support arranged on the pedestal below a first side of the supporting mechanism to support the supporting mechanism, wherein a supporting height of the support can be changed;
   a connector arranged on the pedestal below a second side of the supporting mechanism and configured to connect the supporting mechanism with the pedestal in a manner that the two have motion redundancies with each other, the second side being opposite to the first side; and
   a driving component coupled with the support and driving the supporting height of the support to change, causing a movement of the first side of the supporting mechanism in a vertical direction.

4. The vacuuming apparatus of claim 3, wherein the support comprises a cam.

5. The vacuuming apparatus of claim 4, wherein the driving component comprises a motor.

6. The vacuuming apparatus of claim 5, wherein the motor is coupled with the cam via a speed variable mechanism.

7. The vacuuming apparatus of claim 1, wherein the swinging mechanism comprises:
   a pedestal below the supporting mechanism;
   a first support arranged on the pedestal below a first side of the supporting mechanism to support the supporting mechanism, wherein a supporting height of the first support can be changed;
   a second support arranged on the pedestal below a second side of the supporting mechanism to support the supporting mechanism, wherein a supporting height of the second support can be changed, the second side being adjacent to the first side;
   a connector arranged on the pedestal below an end portion between a third side and a fourth side of the supporting mechanism and configured to connect the supporting mechanism with the pedestal in a manner that the two have motion redundancies with each other, wherein the third side and the fourth side are opposite to the first side and the second side respectively; and
   a driving component coupled with the first support and the second support, and configured to drive the supporting height(s) of the first support and/or the second support to change, causing movement(s) of the first side and/or the second side of the supporting mechanism in a vertical direction.

8. The vacuuming apparatus of claim 7, wherein the driving component is coupled with the first support and the second support via corresponding clutches disconnectably.

9. The vacuuming apparatus of claim 7, wherein the connector comprises a cardan joint.

10. The vacuuming apparatus of claim 1, further comprising:
    an oiling mechanism for oiling the oil immersed device.

11. The vacuuming apparatus of claim 10, further comprising:
    a controller for controlling operations of the supporting mechanism, the swinging mechanism, the vacuuming mechanism and the oiling mechanism.

12. The vacuuming apparatus of claim 1, wherein the vacuuming mechanism comprises:
    a vacuum pump;

a first pipeline connected between the vacuum pump and the oil immersed device; and a filter arranged between the first pipeline and the oil immersed device.

13. The vacuuming apparatus of claim 12, further comprising an oiling mechanism for oiling the oil immersed device, wherein the vacuuming mechanism further comprises:
a first control valve for controlling connection and disconnection of the first pipeline;

the oiling mechanism comprises:
an oil storage tank for storing insulating oil;
a second pipeline connected between the oil storage tank and the vacuum pump and between the oil storage tank and the oil immersed device;
a second control valve for controlling connection and disconnection of a portion of the second pipeline, between the oil storage tank and the vacuum pump;
a third control valve for controlling connection and disconnection of a portion of the second pipeline, between the oil storage tank and the oil immersed device.

14. A vacuuming apparatus for removing bubbles from an oil immersed device containing components immersed in insulating oil, the vacuuming apparatus comprising:
a supporting mechanism for supporting the oil immersed device;
a swinging mechanism for swinging the supporting mechanism and the oil immersed device supported thereby;
a vacuuming mechanism for vacuuming inside the oil immersed device; and
an oiling mechanism for oiling the oil immersed device.

15. A vacuuming apparatus for removing bubbles from an oil immersed device containing components immersed in insulating oil, the vacuuming apparatus comprising:
a supporting mechanism for supporting the oil immersed device;
a swinging mechanism for swinging the supporting mechanism and the oil immersed device supported thereby;
a vacuuming mechanism for vacuuming inside the oil immersed device; and
wherein the swinging mechanism comprises:
a pedestal below the supporting mechanism;
a support arranged on the pedestal below a first side of the supporting mechanism to support the supporting mechanism, wherein a supporting height of the support can be changed;
a connector arranged on the pedestal below a second side of the supporting mechanism and configured to connect the supporting mechanism with the pedestal in a manner that the two have motion redundancies with each other, the second side being opposite to the first side; and
a driving component coupled with the support and driving the supporting height of the support to change, causing a movement of the first side of the supporting mechanism in a vertical direction.

* * * * *